May 31, 1966     R. E. BLACK     3,254,211
RADIOACTIVE RADIATION TRANSDUCER DEVICE FOR MEASURING
VARIABLE CONDITIONS
Filed Dec. 11, 1961

INVENTOR.
Robert E. Black
BY Warren D. Hill
ATTORNEY 3,254,211
RADIOACTIVE RADIATION TRANSDUCER DEVICE FOR MEASURING VARIABLE CONDITIONS
Robert E. Black, Utica, Mich., assignor to General Motors Corporation, Detroit, Mich., a corporation of Delaware
Filed Dec. 11, 1961, Ser. No. 158,388
14 Claims. (Cl. 250—43.5)

This invention relates to measuring instruments and more particularly to improvements in measuring instruments comprising a radiation transducer device.

In previously known measuring instruments it has not been possible to make a measurement of a condition within a closed assembly such as a transmission housing, for example, and to send the information outside the assembly without the use of electrical or mechanical connections. Frequently it is undesirable to make such connections because of the expense involved, because of the deleterious effect of the connections on the assembly, or because the mere existence of such connections may tend to change the very condition which is to be measured.

Accordingly, it is an object of this invention to provide a method and apparatus for making the measurement of a desired condition and transmitting the information thus obtained to a location remote from the measuring device without the use of electrical or mechanical connections.

This invention is carried out by providing a transducer assembly comprising a beta particle source, a target spaced from said source for producing X-rays upon being bombarded by the particles from said source, and some means responsive to the condition to be measured for modulating the beta particles to thereby modulate the intensity of X-rays produced. An X-ray detector is located remotely from the target. Further, the invention contemplates that the target and the detector may be separated by a mass of material which can be penetrated by the X-rays.

The above and other advantages of the invention will be made more apparent from the following specification taken in conjunction with the accompanying drawings wherein like reference numerals refer to like parts, and wherein.

Figure 1:
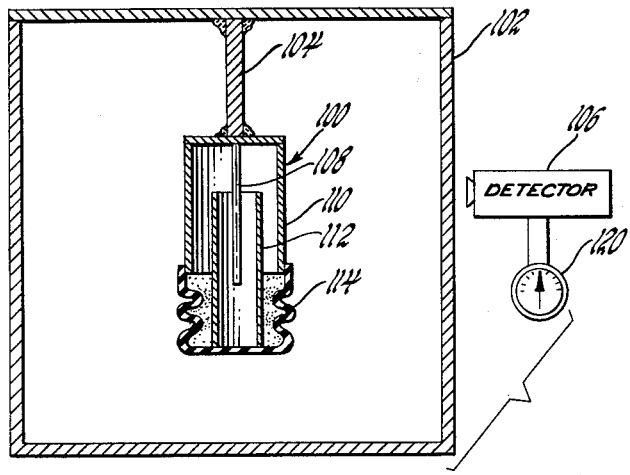
FIGURE 1 is a cross-sectional view of one embodiment of the invention wherein a pressure transducer is located within a closed container and an X-ray detector is located outside the container.

FIGURE 1 of the drawings illustrates a complete measuring unit including a transducer means within a completely enclosed housing and a detector outside the housing. The remaining figures illustrate transducer units without a detector. It is intended that each of these units be used with a detector in a complete system such as that of FIGURE 1.

It has previously been known to use radiation from radioisotopes for measuring instrumentation wherein a radiation source is spaced from a radiation detector and the mass of some material existing in the space between the source and detector is measured by counting the radiation particles or photons reaching the detector and calibrating the detector output in terms of the mass, size, or density of the material. The percentage of radiation transmitted from the source to the detector will depend upon the radiation absorbing characteristics of the material and the amount of the material separating the source from the detector. However, this technique has severe limitations; for example, if an alpha or beta source is used the radiation will be easily modulated due to its poor penetration characteristics, but the detector must be placed very close to the source in order to detect the radiation. If the detector is far away from the source or separated from the source by the wall of a housing, for example, then the alpha or beta radiation will be almost completely absorbed before it reaches the detector. This difficulty can be overcome by the use of a gamma source since gamma radiation will travel long distances through air and even through solid objects without being greatly absorbed due to its good penetration characteristics. However, it is extremely difficult to modulate the gamma radiation by the intervening mass of material because of its good penetration characteristics.

The present invention takes advantage of the inherent penetration characteristics of the various types of radiation by using a beta particle source, modulating the radiation therefrom, utilizing the modulated beta radiation to produce X-rays, and then measuring the highly penetrating X-rays with a detector. This enables the detector to be placed remotely from the source and even permits the source and detector to be located on opposite sides of a wall which would be substantially impervious to beta radiation. It has been found that for the best results, only the characteristic X-rays should be measured; that is, those X-rays which have an energy characteristic of the atomic number of the target material.

Referring now to FIGURE 1, a pressure transducer 100 is located within a completely enclosed housing 102 and is supported therefrom by a member 104. A detector 106 is placed outside the housing 102 in a position opposite the transducer 100. The transducer comprises an elongated beta source 108 carried by the support member 104 and a cylindrical target member 110, also carried by support member 104 and arranged coaxially with the beta source 108. A cylindrical beta particle shield 112 is coaxially disposed between the beta source 108 and 110 and is arranged for axial movement. The shield 112 is suspended from a target 110 by a bellows 114 to form an airtight compartment within the transducer 100. As the pressure within the housing varies, the bellows will be compressed or elongated and the shield 112 will move axially between the beta source 108 and the target 110. The beta source 108 is preferably strontium 90 deposited on a graphite core. The target is made of tungsten or other high atomic number elements such as uranium, lead, or gold and the shield is composed of aluminum, but other low atomic elements including beryllium, carbon, and silicon could be substituted for aluminum.

In operation, when the pressure within the housing 102 is low, the bellows will expand to withdraw the shield 112 from shielding position. Beta particles emanating from the source 108 will impinge on the target 110 to produce characteristic X-rays which are more penetrating than the beta radiation. The X-rays will pass through the walls of the housing 102 and will be measured by the detector 106 which is connected by suitable circuitry to a meter 120 which is calibrated in terms of pressure. If the pressure within the housing 102 increases, then the bellows 114 will tend to collapse and the shield 112 will move upwardly into the region between the source 108 and target 110 thereby preventing a portion of the beta radiation from reaching the target 110 and accordingly decreasing the intensity of the characteristic X-rays produced to change the reading of the meter 120. The pressure within the housing 102 determines the amount of beta radiation which reaches the target 110 and thereby continually modulates the characteristic X-ray production.

Figure 2:
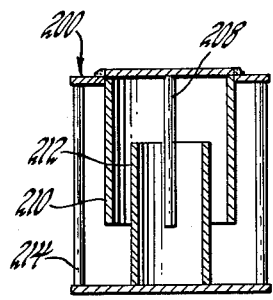
FIGURE 2 shows a transducer responsive to temperature according to another embodiment of the invention.

The transducer 200 shown in FIGURE 2 is intended for thermometry applications and structurally is somewhat similar to transducer 100. It includes a beta source 208, a coaxial cylindrical target 210, a cylindrical coaxial beta shield 212, and a pair of heat expansible rods 214 composed of aluminum interconnecting the shield 212 and the target 210. The heat expansible elements 214 must have different thermal coefficients of expansion than that of the other materials in the transducer so that as the temperature of the transducer environment changes, the shield 212 will move up or down to modulate the beta radiation transmission and hence modulate the characteristic X-ray production. A detector, not shown, remote from the transducer 200 would be calibrated in terms of temperature. The materials used in the transducer 200 are similar to those in the transducer 100 except that the shield 212 should preferably be made of graphite.

Figure 3:
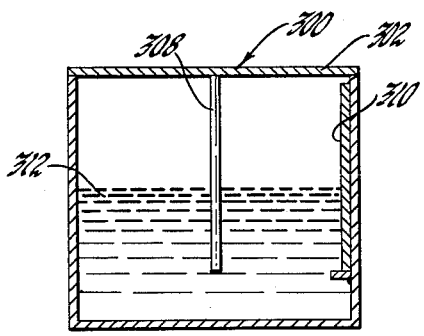
FIGURE 3 shows a transducer responsive to liquid level according to another embodiment of the invention.

FIGURE 3 illustrates a transducer 300 for measuring liquid level within a container 302. The transducer comprises an elongated beta source 308 extending vertically from the top of the container and supported thereby and a coextensive target member 310 mounted on one wall of the container 302 and parallel to the beta source 308. In this transducer the shield or modulator is the liquid 312, the level of which is to be measured. It is obvious that the liquid level will determine the amount of beta radiation reaching the target 310 and accordingly will modulate the production of characteristic X-rays at the target. As in the previous systems a detector, not shown, outside the container 302 is used to provide an indication of the amount of characteristic X-ray production and hence of the liquid level.

Figure 4:
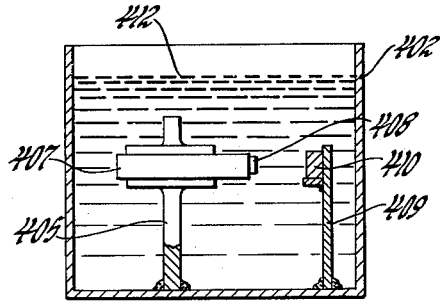
FIGURE 4 is a sensing and modulation unit responsive to displacement of a mechanical element according to another embodiment of the invention.

A displacement transducer is illustrated in FIGURE 4 and comprises a container 402 containing fluid 412. Immersed in the fluid is a stationary support 409 which holds a body of target element 410 and a further support 405 which carries a movable element 407 having a beta emitter 408 secured to one end thereof. The element 407 is suitably connected to any element, not shown, whose displacement is to be measured. If the beta source 408 is moved toward the stationary target 410, then the amount of fluid 412 between the source and target is diminished, thereby changing the amount of beta transmission to the target and hence the amount of characteristic X-rays produced for detection at a location outside of the container 402. Experiments have indicated that where the source 408 comprised a pellet of 0.04 millicurie of phosphorous-32, the target was gold and the fluid bath 412 was glycerin, very good results were obtained by using a detector comprising a scintillating crystal and photomultiplier feeding a spectrometer adjusted to detect only the characteristic gold X-rays of 68.8 kev. energy. Decreasing the source to target distance from 0.08 inch to 0.02 inch resulted in doubling the net count rate. The change in count rate was fairly linear throughout that range.

Figure 5:
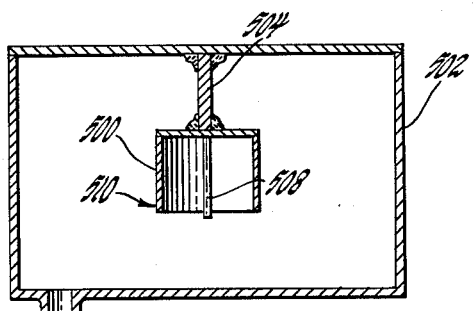
FIGURE 5 is a transducer responsive to gas density according to another embodiment of the invention.

A transducer for measuring the density of a gas is shown in FIGURE 5. The transducer 510 consists of a beta radiation source 508 and a coaxial target 500, both attached by means of a supporting member 504 to a gas container 502. In this transducer the shield or modulator is gas within the container. As more gas is placed inside the container through port 514, the density will increase. As the density increases, more beta radiation from the source 508 will be absorbed by the gas. Consequently, less beta radiation will strike the target 500 and the production of characteristic X-rays will be reduced.

The transducer could be attached to the exterior of a vehicle to measure the density of gas around the vehicle. A suitable detector would then be placed inside the vehicle in this application.

It will thus be seen that this invention provides a convenient method of sensing a condition at one location and transmitting the information to a remote location without the use of electrical or mechanical connections. The invention may be applied to many types of measuring instruments and, in fact, may be used to measure any quantity which can be made to result in mechanical motion of one part with respect to another, and it is especially useful in measuring quantities in inaccessible locations.

The embodiments of the invention disclosed herein are for illustrative purposes only and the scope of the invention is intended to be limited only by the following claims:

1. A radiation transducer for a measuring instrument comprising a beta particle source, a target spaced from said source for producing X-rays upon bombardment by beta particles from said source, means controlled by the condition to be measured for modulating the beta particles to modulate the production of X-rays, and an X-ray detector for measuring the X-ray intensity whereby the detector output is a function of the condition to be measured.

2. A radiation transducer for a measuring instrument comprising a beta particle source, a target spaced from said source for producing X-rays upon bombardment by beta particles from said source, shield means between said source and target for modulating the beta particles in accordance with the condition being measured to modulate effectively the production of X-rays, and an X-ray detector for measuring the X-ray intensity whereby the detector output is a function of the condition being measured.

3. A radiation transducer for a measuring instrument comprising a beta particle source, a target spaced from said source for producing X-rays upon bombardment by beta particles from said source, beta absorbing means between the source and target, and means responsive to the condition being measured for varying the beta absorbing means for modulating the beta particles to modulate the production of X-rays, and an X-ray detector for measuring the X-ray intensity whereby the detector output is a function of the condition being measured.

4. A radiation transducer for a measuring instrument within a housing comprising a beta particle source within the housing, a target within the housing spaced from said source for producing X-rays upon bombardment by beta particles, modulating means controlled by a condition to be measured for modulating the beta particles to thereby modulate the production of X-rays, and an X-ray detector outside the housing for measuring the intensity of X-rays passing through the housing whereby the detector output is a function of the condition.

5. A radiation transducer for a measuring instrument within a housing comprising a beta particle source within the housing, a target within the housing spaced from said source for producing X-rays upon bombardment by beta particles, beta shielding material between the source and target, the effectiveness of said material being controlled by a condition to be measured for modulating the beta particles to thereby modulate the production of X-rays, and an X-ray detector outside the housing for measuring the intensity of X-rays passing through the housing whereby the detector output is a function of the condition.

6. A radiation transducer for a measuring instrument within a housing comprising a beta particle source within the housing, a target within the housing spaced from said source for producing X-rays upon bombardment by beta particles, space between said source and target, a homogenous beta absorbing material filling said space, means for varying the spacing between said source and target thereby varying the amount of beta absorbing material between said source and target for modulating the beta particles to thereby modulate the production of X-rays, and an X-ray detector outside the housing for measuring the intensity of X-rays passing through the housing whereby the detector output is a function of the spacing between the source and target.

7. A radiation transducer for a measuring instrument comprising a beta particle source, a target spaced from said source for producing X-rays which have an energy characteristic of the atomic number of the target upon bombardment by beta particles from said source, means controlled by the condition being measured for modulating the beta particles to modulate effectively the production of characteristic X-rays, and an X-ray detector for measuring the intensity of the characteristic X-rays whereby the detector output is a function of the condition being measured.

8. A method of measuring a condition comprising bombarding a target with beta particles to produce X-rays, modulating the beta particles as a function of the condition, and measuring the X-rays produced by the modulated beta particles whereby the intensity of the X-rays is a function of the condition being measured.

9. A method of measuring a condition comprising bombarding a target with beta particles to produce characteristic X-rays, modulating the beta particles as a function of the condition, and measuring the intensity of the characteristic X-rays produced by the modulated beta particles whereby the intensity of the X-rays is a function of the condition being measured.

10. A method of measuring a condition existing within a housing comprising bombarding a target within the housing with beta particles to produce X-rays, modulating the beta particles as a function of the condition, passing the X-rays through the housing, and measuring the intensity of the X-rays transmitted through the housing whereby the intensity of the X-rays is a function of the condition being measured.

11. A method of measuring a condition existing within a housing comprising bombarding a target within the housing with beta particles to produce X-rays, partially shielding the beta particles from the target, varying the effective shielding to modulate the beta particles as a function of the condition, passing the X-rays through the housing, and measuring the intensity of the X-rays transmitted through the housing whereby the intensity of the X-rays is a function of the condition being measured.

12. A method of measuring the displacement of an element comprising bombarding a target with beta particles to produce X-rays, modulating the beta particles as a function of the displacement, and measuring the intensity of the X-rays produced whereby the intensity of the X-rays is a function of the displacement.

13. A method of measuring the displacement of an element within a housing comprising bombarding a target within said housing with beta particles to produce characteristic X-rays, partially shielding the target with beta absorbing material, displacing the beta absorbing material as a function of the displacement of the element, passing the characteristic X-rays through the housing, and measuring the characteristic X-rays transmitted through the housing whereby the intensity of the X-rays is a function of the displacement.

14. A method of measuring density of a gas comprising passing beta particles through the gas, bombarding a target with the beta particles transmitted through the gas to produce X-rays, and measuring the intensity of the X-rays produced whereby the intensity of the X-rays is a function of the gas density.

References Cited by the Examiner

UNITED STATES PATENTS

| | | | |
|---|---|---|---|
| 2,275,748 | 3/1942 | Fearon | 250—83.6 |
| 2,765,410 | 10/1956 | Herzog | 250—43.5 |
| 2,800,591 | 7/1957 | Gilman | 250—106 |
| 2,817,764 | 12/1957 | Jacobs et al. | 250—108 |
| 2,933,607 | 4/1960 | Friedman | 250—43.5 |
| 2,964,628 | 12/1960 | Ohmart | 250—43.5 |
| 2,999,935 | 9/1961 | Foster | 250—105 |
| 3,015,030 | 12/1961 | Jones | 250—83.6 |
| 3,123,714 | 3/1964 | Chope | 250—43.5 |

FOREIGN PATENTS 1,056,392  4/1959  Germany.

RALPH G. NILSON, *Primary Examiner.*

W. F. LINDQUIST, *Assistant Examiner.*